(12) United States Patent
Jones

(10) Patent No.: US 7,134,681 B1
(45) Date of Patent: Nov. 14, 2006

(54) HANDLE ASSEMBLY FOR A YARD CART

(76) Inventor: Michael Timothy Jones, 6101 Tracy Ave., Eden Prairie, MN (US) 55436

( * ) Notice: Subject to any disclaimer, the term of this patent is extended or adjusted under 35 U.S.C. 154(b) by 0 days.

(21) Appl. No.: 11/131,467

(22) Filed: May 18, 2005

(51) Int. Cl.
 *B62B 1/00* (2006.01)
(52) U.S. Cl. .............. 280/651; 280/652; 280/656; 280/653; 280/47.41; 280/47.34; 280/47.17; 280/33.992
(58) Field of Classification Search ........ 280/651–656, 280/47.34, 47.41, 47.17, 414.1, 33.992
See application file for complete search history.

(56) References Cited

U.S. PATENT DOCUMENTS 2,718,431 A * 9/1955 Dominic .................. 298/22 R
5,411,284 A * 5/1995 Harbin ...................... 280/656
5,678,978 A * 10/1997 Markham .................. 414/477
6,461,096 B1 * 10/2002 Mentele et al. ............ 414/480
6,527,494 B1 * 3/2003 Hurlburt .................... 414/482
2005/0200190 A1 * 9/2005 Nye ............................. 298/5

* cited by examiner

*Primary Examiner*—J. Allen Shriver
*Assistant Examiner*—Cynthia F. Collado
(74) *Attorney, Agent, or Firm*—Herman H Bains

(57) ABSTRACT

A handle assembly for converting a conventional yard cart for use in the manner of a wheelbarrow includes an L-shaped handle including a vertical portion and a horizontal portion. A socket member is connected to the yard cart tow bar which is normally coupled to a garden tractor. The handle member is connected to the socket member after the tow bar is uncoupled from the garden tractor thereby enabling the yard cart to be guided and moved by an operator in the manner of a wheelbarrow.

3 Claims, 1 Drawing Sheet

HANDLE ASSEMBLY FOR A YARD CART

FIELD OF THE INVENTION

This invention relates to a handle assembly or device for attachment to the tow bar of a yard cart to enable the cart to be used in the manner of a wheelbarrow.

BACKGROUND OF THE INVENTION

Yard carts are extensively used by urban and suburban homeowners for hauling various materials such as plants, fertilizers, concrete blocks, etc. Yard carts are usually towed by garden tractors and traditionally have a ten (10) or seventeen (17) cubic foot capacity. These carts are usually formed of metal and have a hinged or removable rear gate or panel.

These yard carts are difficult to maneuver when the cart is uncoupled from the tractor. The present invention enables a user to use the cart in the manner of a wheelbarrow.

SUMMARY OF THE INVENTION

An object of this is to provide a novel handle assembly for ready attachment to the tow bar of a conventional yard cart when the yard cart is in an uncoupled condition to enable a user to use the yard cart in the manner of a wheelbarrow.

The handle assembly includes an L-shaped handle having a lower vertical portion which telescopically engages a vertical socket member connected to the tow bar. The L-shaped handle also includes a horizontal portion having a U-shaped handle bar secured thereto. The handle assembly may be readily attached to the tow bar and readily removed therefrom. When the handle assembly is secured to the tow bar, the yard cart functions as an operator-guided vehicle thereby expanding its utility.

DESCRIPTION OF THE PREFERRED EMBODIMENT

Figure 1:
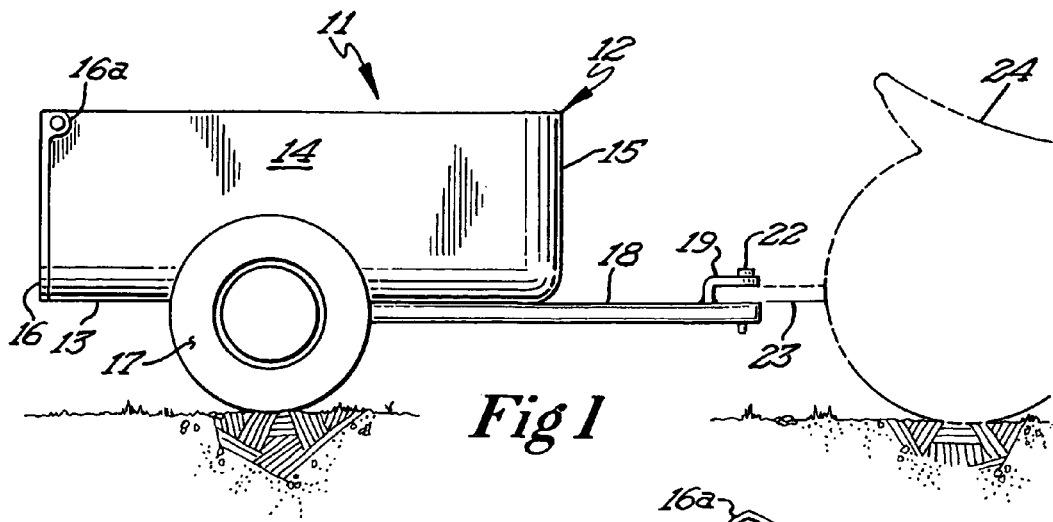
FIG. 1 is side-elevational view of a commercial yard cart illustrated in coupled relation with a yard tractor.
Figure 2:
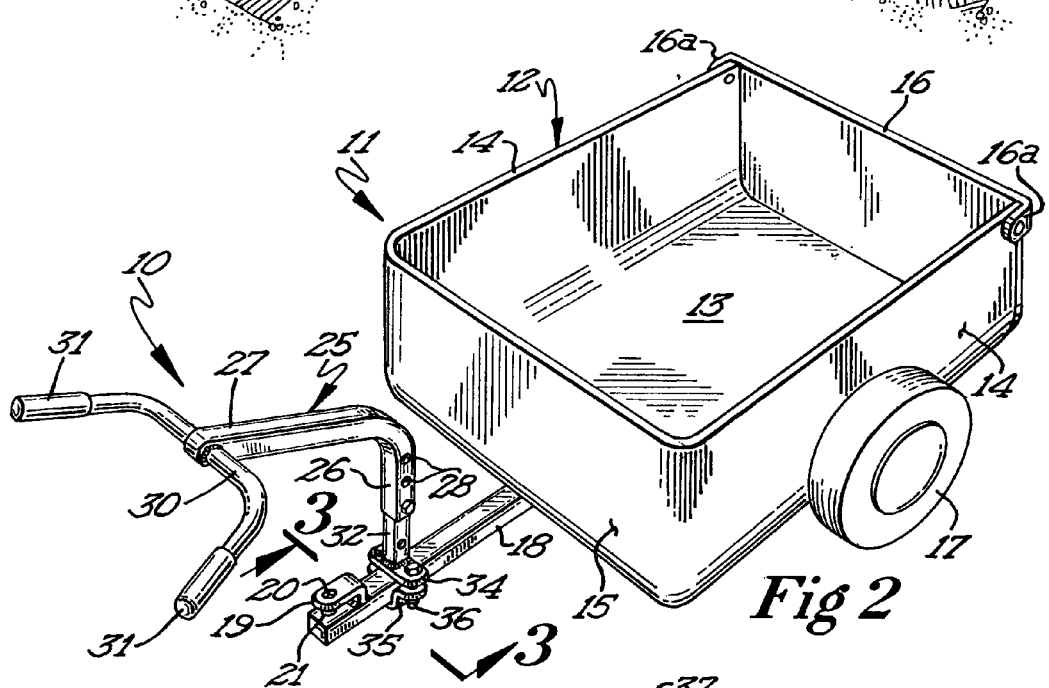
FIG. 2 is a perspective view of a yard cart illustrating the handle assembly secured thereto.
Figure 3:
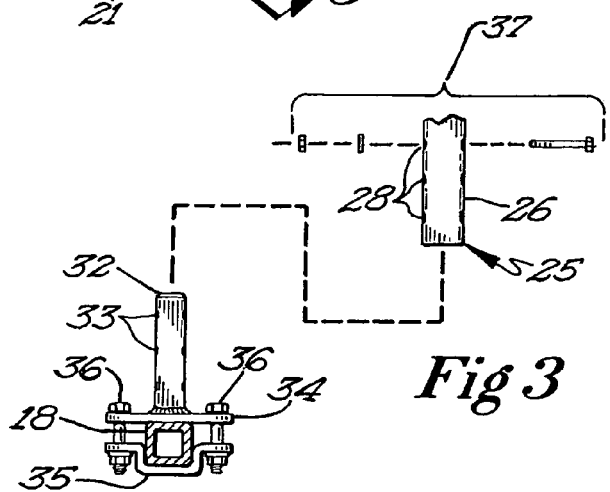
FIG. 3 is a cross-sectional view taken approximately along line 3—3 of FIG. 2 and looking in direction of the arrows, the parts which are shown being partially exploded.

Referring now to the drawings, and more particularly to FIG. 2 it will be seen that one embodiment of the novel handle assembly or device, designated generally by the reference 10, is shown mounted on the tow bar of a conventional yard cart 11. The yard cart includes an open top rectangular box 12 which is formed of metal and includes opposed side walls 14, a bottom wall 13, a front wall 15, and a rear panel or gate 16. The gate 16 is pivoted or hinged to the rear end portion of the side walls by pivot pin 16a.

The capacity of the yard cart 11 may be ten (10) or seventeen (17) cubic feet, the capacity of conventional yard carts. The yard cart 11 is provided with pneumatic tires or ground engaging wheels 17 and an elongate tow bar 18. The tow bar 18 is of rectangular cross-sectional shape and is secured to the lower surface of the bottom wall along the longitudinal centerline thereof. An L-shaped clevis 19 is secured to the front end portion of the tow bar 18 and has an aperture or opening 20 therein. The opening 20 is disposed in registering relation with an opening 21 in the tow bar.

A clevis pin 22 extends through the openings 20 and 21 and through an opening in a tractor hitch 23 of a garden tractor 24 to couple the yard cart 11 to the garden tractor. The clevis pin 22 is secured against displacement by a conventional cotter key in a well known manner.

When the yard cart 11 is uncoupled from the garden tractor 24, a user may want to use the cart to move materials without hitching the cart to the garden tractor 24. It is difficult to maneuver the cart 11 by using the tow bar to pull or push the cart. Applicant's novel handle assembly allows a user to use the cart as a wheelbarrow or a similar operator powered and guided vehicle.

The handle assembly 10 includes a generally L-shaped handle, 25 including a vertical portion 26 and a horizontal portion 27 integral with the vertical portion. The handle 25 is of hollow construction and formed of a suitable metallic material. In the embodiment shown, the handle 25 is of rectangular cross-sectional configuration although the handle may be circular in cross-sectional configuration or may have other shapes.

It will be noted that the front or free end of the horizontal portion 27 of the handle 25 has an opening 29 therein. A generally U-shaped handle bar 30 projects through the opening and is rigidly secured to the handle. The outer ends of the handle bar 30 is provided with handgrips 31 which may be made of rubber, plastic or similar material.

An elongate socket member 32 is provided for connecting the handle 25 to the tow bar 18. The socket member 32 is formed of metal and has a rectangular cross-sectional configuration although it may have other cross-sectional shapes. The socket member 32 has a plurality of vertically spaced apart openings 33 therein. The socket member, when mounted on the tow bar 18, extends vertically upwardly therefrom.

Means are provided for securing the socket member 32 in mounted relation on the tow bar. A flat plate 34 having openings therein is rigidly secured to the lower end of the socket member 32 and is positioned upon the tow bar 18. A lower plate 35 having openings therein engages the lower surface of the tow bar 18. The lower plate 35 is of U-shaped configuration in the embodiment shown but the lower plate may also be of flat configuration.

Nut and bolt assemblies 36 secure the socket member 32 to the tow bar. The vertical portion 26 of the handle 25 telescopically engages the socket member 32, and nut and bolt assemblies 37 extend through openings in the vertical handle portion 26 and through openings in the socket member 32 to secure the handle to the socket member. In the embodiment shown, the socket member 32 is a male socket member while the vertical handle portion 26 functions as a female socket member. The reverse arrangement would also function equally as well.

It will be noted that the vertical handle portion 26 can be vertically adjusted relative to the socket member 32 thereby allowing vertical adjustment of the handle 25. The handle 25 may also be adjusted longitudinally along the tow bar 18. These adjustments allow the handle to be positioned most favorably to a particular user.

When the yard cart 11 is uncoupled from a garden tractor, the handle assembly may be readily applied to the tow bar 18. The handle assembly may be adjusted for optimum efficiency and comfort for the user. The yard cart 11 may then be used in the manner of a wheelbarrow for transporting materials and objects. The use of the handle assembly thereby increases the utility of the yard cart. The handle assembly may be readily removed from the tow bar 18 thereby enabling the yard cart to be used in towed fashion with the garden tractor.

What is claimed is:

1. A handle assembly for converting a towable yard cart to an operator guided wheelbarrow type vehicle, the cart including an open top rectangular box and a pair of ground engaging wheels, the box having a flat bottom wall having a lower surface an elongate tow bar secured to the lower surface of the bottom wall of the box and projecting forwardly therefrom, said tool bar having hitch means on an end thereof for coupling to the hitch of a garden tractor, the handle assembly comprising an elongate, substantially straight, socket member, means for connecting the lower end of the socket member to the tow bar to project upwardly from the tow bar in substantially right angular relationship thereto, a generally L-shaped handle member including a vertical portion and a horizontal portion, a generally U-shaped handle bar secured to the horizontal portion, said vertical portion defining a socket telescopically engaging the socket member, means connecting the vertical portion to the socket member to enable vertical adjustment of the handle member relative to the socket member whereby when the yard cart is uncoupled from a garden tractor, and the handle assembly is attached to the tow bar, enables an operator to move and maneuver the yard cart in the manner of a wheelbarrow.

2. The handle assembly as defined in claim 1 wherein said socket member is a male socket member and said vertical portion of the handle functions as a female socket member.

3. The handle assembly as defined in claim 1 wherein the handle assembly is longitudinally adjustable along the tow bar.

\* \* \* \* \*

UNITED STATES PATENT AND TRADEMARK OFFICE
CERTIFICATE OF CORRECTION

PATENT NO.        : 7,134,681 B1
APPLICATION NO.   : 11/131467
DATED             : November 14, 2006
INVENTOR(S)       : Michael Timothy Jones It is certified that error appears in the above-identified patent and that said Letters Patent is hereby corrected as shown below:

Title page
   #75 - Inventor Should read
   10531 E. Riverview Drive
   Eden Prairie, MN 55437

Signed and Sealed this

Seventeenth Day of April, 2007

JON W. DUDAS
*Director of the United States Patent and Trademark Office*